Oct. 14, 1952 — C. E. OCKERT — 2,614,133
CONTINUOUS ADSORPTION PROCESS
Filed June 30, 1949 — 2 SHEETS—SHEET 1
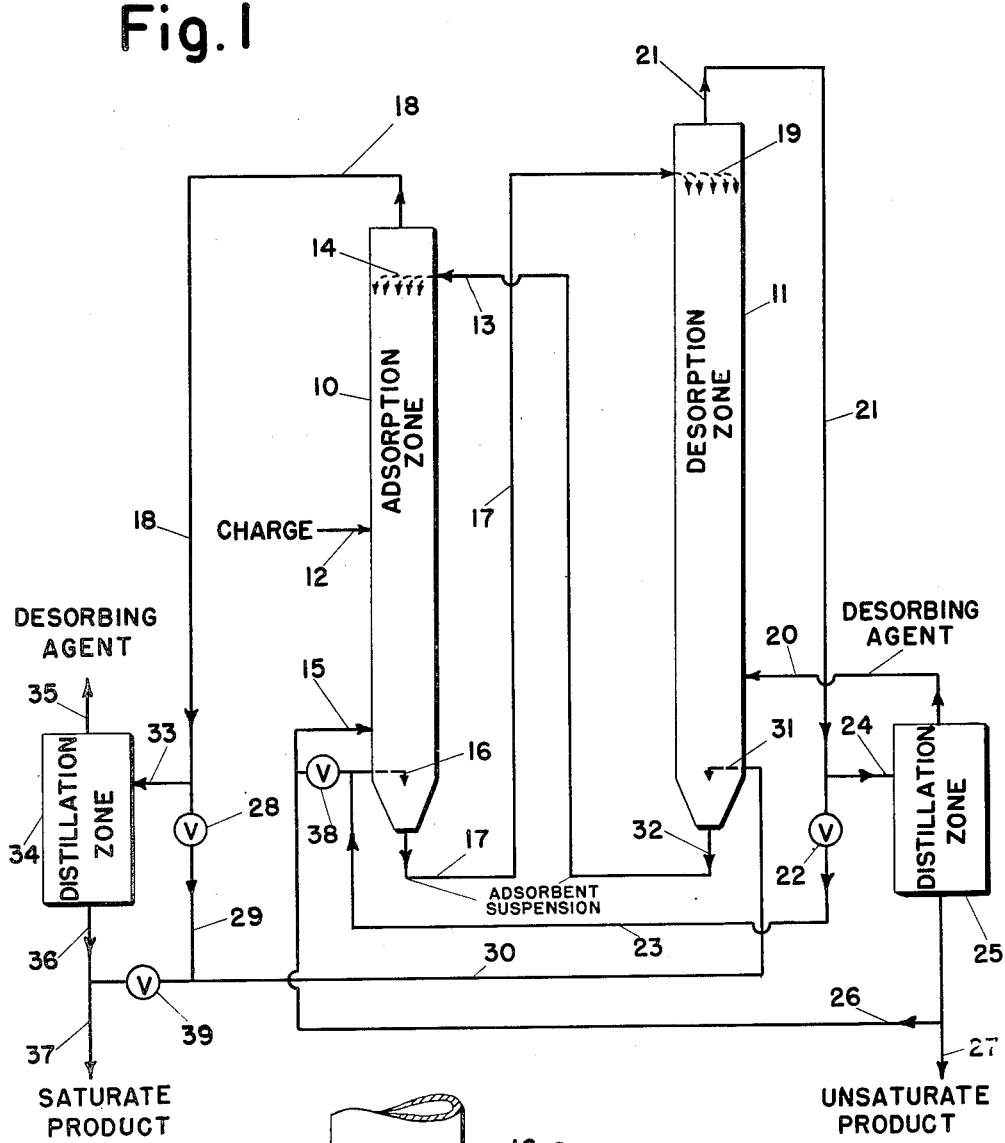
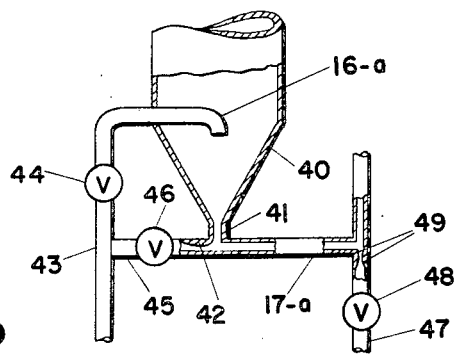
INVENTOR.
CARL E. OCKERT
BY
Busser and Harding
ATTORNEYS

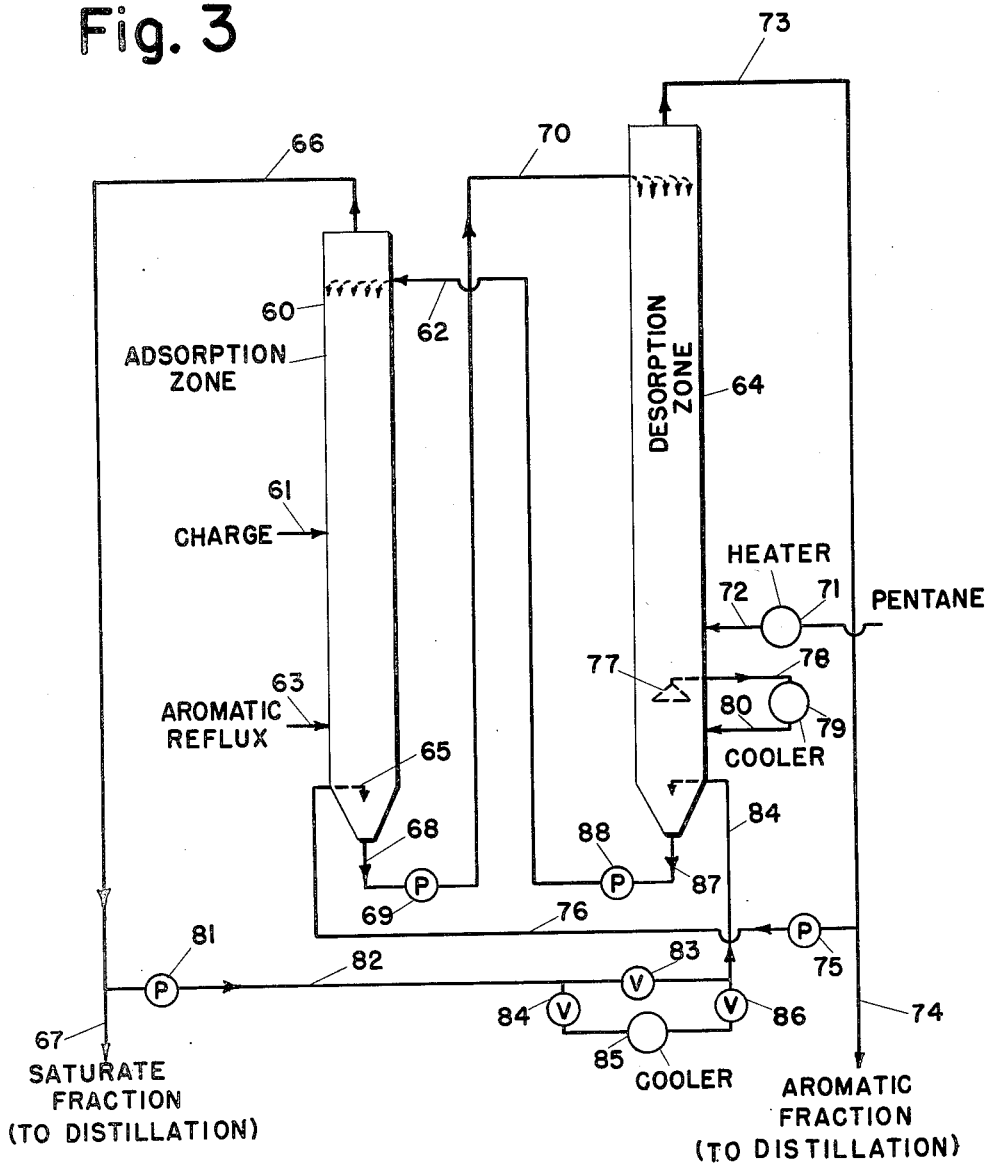

Patented Oct. 14, 1952

2,614,133

UNITED STATES PATENT OFFICE 2,614,133

CONTINUOUS ADSORPTION PROCESS

Carl E. Ockert, Wilmington, Del., assignor to Sun Oil Company, Philadelphia, Pa., a corporation of New Jersey Application June 30, 1949, Serial No. 102,275

15 Claims. (Cl. 260—674)

This invention relates to the separation of organic compounds of different adsorbabilities by means of a selective adsorbent. More particularly, the invention is directed to a continuous process for effecting such separations wherein a finely divided selective adsorbent is continuously circulated through a system including an adsorption zone and a desorption zone in each of which zones the adsorbent is contacted with material in liquid phase. The process is especially useful for separating liquid hydrocarbons having different degrees of saturation.

It is known that hydrocarbons may be separated according to chemical type by treatment in liquid phase with a suitable selective adsorbent, for instance, silica gel or activated carbon. Such treatment is especially useful for separating a less saturated hydrocarbon from a more saturated hydrocarbon, as in separating aromatics from saturate hydrocarbons or in separating olefins from saturates. The procedure most often employed in carrying out the treatment comprises passing the charge through a stationary body of adsorbent to selectively adsorb unsaturates, after which the adsorbent may be treated in situ with a desorbing agent, either vapor or liquid, or by application of heat or both to remove the adsorbate and regenerate the adsorbent for re-use.

It is recognized that the use of the adsorbent as a stationary mass involves certain inherent disadvantages, such as non-continuous operation and variation of product composition during each cycle; and accordingly various methods have been proposed in which the adsorbent is circulated through the system to permit continuous operation. A major difficulty in the treatment of organic materials, such as hydrocarbons, in liquid phase by this type of procedure resides in effecting the movement of adsorbent properly through the system. The continuous transportation of adsorbent from the adsorption zone to the desorption zone and from the desorption zone back to the adsorption zone, without at the same time carrying liquids improperly from one zone to the other, is one phase of the problem. Also, when the adsorbent is used in the form of a moving bed in each zone, it may tend to channel and flow unevenly through the system due to the fact that the finely divided solids in the presence of liquid assume a more or less muddy character. Such channelling or non-uniform movement of the adsorbent will greatly reduce the efficiency of both the adsorption and desorption steps.

The present invention is directed to a continuous adsorption-desorption process involving contact of finely divided adsorbent with materials in liquid phase wherein the movement of adsorbent through the system is accomplished in improved manner.

In one embodiment for separating a charge mixture composed of unsaturate and saturate hydrocarbons, the process comprises feeding finely divided adsorbent in the form of a suspension into the upper part of an adsorption zone and permitting the adsorbent to fall through the zone countercurrent to the liquid charge to selectively adsorb the unsaturate component. A stream comprising the saturate product is withdrawn from the top. Into the lowermost part of the adsorption zone a liquid stream comprising a portion of the unsaturate product obtained from the desorption zone is continuously introduced, preferably being injected therein in a direction toward the bottom outlet, to maintain the adsorbent in suspension and function as a transporting medium while preventing outflow of other liquid from the bottom of the adsorption zone. The resulting suspension is continuously passed to and introduced into the upper part of a desorption zone, wherein the adsorbent is allowed to fall through the zone countercurrent to a liquid desorbing agent to displace the unsaturate component from the adsorbent. A mixture of desorbing agent and unsaturate is withdrawn from the top of the desorber. In one manner of practicing the process a portion of this mixture is used as the transporting medium which is introduced into the lowermost part of the adsorption zone. In another way of conducting the process the mixture is distilled to separate desorbing agent from the unsaturate product and a portion of the unsaturate product is employed as such transporting medium. Into the lowermost part of the desorption zone a liquid stream comprising a portion of the saturate product obtained from the adsorption zone is continuously introduced, preferably being injected therein in a direction toward the bottom outlet, to maintain the adsorbent in suspension and function as a transporting medium while preventing excessive outflow of desorbing agent from the bottom of the zone. The resulting suspension is continuously withdrawn and passed to the upper part of the adsorption zone for re-use of the adsorbent.

In the above-described process it is to be noted that the circulating adsorbent is maintained at all times in a form that may be referred to as "fluidized," that is, either as a suspension in the transporting media or as falling particles in the liquids within the adsorption and desorption zones. At no time does the adsorbent assume the form of a moving bed. Difficulties arising from the moving bed type of operation are thus avoided and transportation of the adsorbent through the system is facilitated.

A further feature of the invention which is especially advantageous in certain cases comprises carrying out the desorption step at a relatively high temperature compared to the adsorption step, in order to facilitate desorption of the unsaturate component from the adsorbent. This feature is particularly useful, for example, in separating aromatics from saturate hydrocarbons, as more fully explained hereinafter. The present procedure of operating with the adsorbent in "fluidized" form readily permits regulation of temperature, so that the desorption step may, if desired, be carried out at high temperature while the adsorption step is conducted at ordinary temperature.

The invention is more specifically illustrated in the accompanying drawings in which:

Fig. 1 is a diagrammatic flowsheet illustrating how the process may be carried out in practice;

Fig. 2 is an elevation view, partly in section, illustrating an arrangement for introducing transporting medium into the bottom portion of either the adsorption zone or desorption zones; and Fig. 3 is a diagrammatic flowsheet generally similar to Fig. 1 but including provisions for conducting the desorption operation at relatively high temperature.

Referring now to Fig. 1, the process will be described for the separation of a liquid charge composed of unsaturate and saturate hydrocarbons. The charge hydrocarbons may be ones which are normally liquid, or may be hydrocarbons which are normally vapors provided the operation is conducted under sufficient pressure to maintain them in the liquid state. For purpose of description, the adsorbent will be referred to as silica gel, although it is to be understood that activated carbon or any other adsorbent which will preferentially adsorb one type of hydrocarbon from the other may be used if desired.

The adsorption and desorption zones are illustrated in the form of elongated vertical columns, 10 and 11 respectively, through which the finely divided silica gel can pass from top to bottom by falling in a substantially unobstructed downward path. The liquid charge enters the system through line 12 and passes into adsorption zone 10 at an intermediate level. Into the upper part of the adsorption zone a stream of finely divided silica gel in suspension in a transporting liquid is continuously introduced by means of line 13, and upon entering the zone the silica gel particles immediately begin to fall downwardly countercurrent to the charge liquid as indicated by arrows at 14. A product stream rich in the saturate component of the charge is withdrawn from the top through line 18. At a level in the lower part of the column a stream of reflux comprising a portion of the unsaturate product obtained from the operation is continuously introduced through line 15 in amount sufficient for effecting the desired degree of separation of the charge components. The reflux tends to preferentially displace saturate hydrocarbons from adsorbed phase on the silica gel as it passes toward the bottom of column 10, thus causing higher concentration of unsaturates on the gel leaving the column and thereby increasing the degree of separation. It may be noted that the use of reflux in this manner is quite similar to the use of reflux in distillation and that the amount of reflux required for a given separation may be calculated by engineering principles similar to those employed in distillation calculations.

As the silica gel approaches the lowermost portion of column 10, it meets a stream of liquid transporting medium, hereinafter more fully specified, which is fed into the column through line 16, preferably being injected therein toward the bottom outlet. The purpose of the transporting medium is to maintain the silica gel particles in the form of a suspension and prevent the formation of a mass of adsorbent at the bottom of the column. It also serves the purpose of preventing improper flow of liquid from a higher level in the column toward the bottom. The amount of transporting medium introduced through line 16 should be so regulated as to effect these results. It is also desirable to regulate the rate of addition of reflux through line 15, along with the rate of withdrawal from the bottom of the column, so that a portion of the reflux will flow downwardly in liquid phase (as distinguished from the adsorbed phase on the silica gel) and thus prevent any upward flow of transporting medium from its point of introduction.

Means for introducing the transporting medium into the bottom of the column are illustrated more specifically in Fig. 2. The bottom of the column is shown as having a tapered portion 40 the end of which connects at 41 with flow line 17—a leading to the desorption zone. The transporting medium passes to the lower part of the column through line 43 containing valve 44 and enters the column through line 16—a which preferably terminates with its outlet downward at a level approximating the top of the tapered portion 40. A by-pass line 45 having valve 46 and connecting with line 17—a at outlet 41 advantageously may be provided as an aid in starting up the process. At the point of connection with outlet 41 it is preferable to include constricting means as shown at 42 so that the transporting medium may be passed adjacent bottom outlet 41 at sufficient velocity to break up any mass of adsorbent particles that may have accumulated and thus facilitate suspension of the particles. Similar provision may be made at any bends in the flow line leading to the other column for introducing additional transporting medium as an aid in starting operation. For instance, at the bend of line 17—a, connecting line 47 having valve 48 and constricting portion 49 may be provided for admission of additional transporting medium at this point.

Referring again to Fig. 1, the suspension of silica gel in the transporting medium is continuously withdrawn from the bottom of adsorption zone 10 through line 17 and sent to the upper part of desorption zone 11. Upon entering the latter zone the silica gel particles immediately begin to fall toward the bottom, as indicated by arrows 19, countercurrent to a liquid desorbing agent which is introduced into a lower part of the zone through line 20. A stream comprising a mixture of desorbing agent and the unsaturate component of the charge is removed from the top of column 11 through line 21. According to a preferred manner of practicing the process, a portion of this stream is passed from line 21 through valve 22 in regulated amount and thence flows by means of line 23 to line 16 whence it enters the bottom of adsorption zone 10 for use as the aforesaid transporting medium. The remainder passes through line 24 to distillation zone 25 for separation of the desorbing agent from the unsaturate product, the recovered desorbing agent being returned through line 20 for re-use in the desorption zone. A portion of the unsaturate product is sent through lines 26 and 15 to the lower part of adsorption zone 10 as a reflux, while the remainder is withdrawn from the system through line 27 as one product of the process.

Into the lowermost part of desorption zone 11 a second transporting medium is introduced, preferably being injected therein toward the bottom outlet, in order to maintain the regenerated silica gel in suspension and prevent any accumulation of silica gel as a mass at the bottom of the column. The arrangement of apparatus for introducing such second transporting medium and withdrawing the resulting suspension from the bottom of column 11 may be as shown in Fig. 2. According to a preferred manner of practicing the process, a portion of the saturate-rich stream withdrawn from adsorption zone 10 through line 18 is passed through valve 28 and lines 29, 30 and 31 for use as the second transporting medium. The resulting suspension of silica gel in transporting medium is continuously withdrawn from the bottom of desorption zone 11 through line 32 and is sent through line 13 into the upper part of adsorption zone 10 for re-use of the adsorbent. It is distinctly preferred to regulate the rate of addition of transporting medium into the desorption zone and the rate of withdrawal of suspension from the bottom such that a minor portion of the desorbing agent introduced into column 11 through line 20 will flow downwardly, thereby preventing any of the transporting medium from passing upwardly through the column and contaminating the unsaturate product stream withdrawn from the top. This minor portion of desorbing agent will pass out of the bottom of column 11 through line 32 in admixture with the silica gel and transporting medium and thus pass into the upper part of the adsorption zone. However, by proper selection of the desorbing agent, as more fully described hereinafter, its presence in the upper part of adsorption zone 10 will not adversely affect the adsorption operation, as it will be readily carried out with the saturate product stream flowing from the top of the column.

The portion of the stream comprising saturate product that is not used as transporting medium is sent from line 18 through line 33 to distillation zone 34 where any desorbing agent present in the stream is distilled off through line 35. The recovered desorbing agent may be returned (by means not shown) to the desorption zone for re-use. The resulting saturate product is withdrawn from distillation zone 34 through line 36 and may be removed from the system by means of line 37 as the other product of the process.

The above-described process may be modified by utilizing a portion of the unsaturate product, resulting after distillation in zone 25, as the transporting medium which is introduced into the bottom of adsorption zone 10. In such case a regulated amount of the unsaturate material which flows through line 26 is passed through valve 38 into line 16, valve 22 being closed. In a further modification of the process a portion of the unsaturate product from distillation zone 34 is used as the transporting medium which is introduced through line 31 into the lowermost part of the desorption zone. In such case valve 28 is closed and a regulated amount of the saturate product is passed through valve 39 and lines 30 and 31.

A large variety of materials are available for use as the desorbing agent in the process. As a general rule the material selected should not have a higher adsorbability on the particular adsorbent being used in the process than the more adsorbable component of the charge; otherwise any desorbing agent which is carried from the bottom of column 11 to the adsorption zone will reduce the efficiency of the adsorption operation to an undesirable extent and require the use of an adsorption column of unreasonable height. In the separation of unsaturate and saturate hydrocarbons it is preferred to employ a saturate hydrocarbon liquid as the desorbing agent. The saturate hydrocarbon or mixture of saturates selected as desorbing agent should, of course, have a boiling range lying outside of the boiling range of the charge so that it may readily be separated from the products by distillation. For example, in the treatment of a charge mixture composed of aromatics and saturates such as a naphtha fraction having a boiling range of say 300–400° F., a saturate hydrocarbon or a mixture of saturates boiling substantially below 300° F. or above 400° F. may be used. For instance, pentane, isopentane, cyclopentane, hexanes, heptanes, octanes or mixtures of such hydrocarbons would be suitable desorbing agents. A higher molecular weight saturate fraction can also be used, for example, a fraction boiling in the gas oil range. Normally gaseous saturate hydrocarbons, such as propane or butane, can also be used provided the operation is conducted under sufficient pressure to maintain them in liquid phase. It is also permissible, though less desirable, to employ an olefinic hydrocarbon or aromatic hydrocarbon as the desorbed agent. Such materials have higher adsorbabilities than saturates and thus tend to improve the efficiency of the desorption operation but decrease the efficiency of the adsorption operation. Since the efficiency of the desorption step may be improved by operation at relatively high temperature, as hereinafter more fully described in connection with Fig. 3, it is generally preferable to use a saturate hydrocarbon as desorbing agent for displacement of aromatics or olefins from the adsorbent. Organic solvents which have adsorbabilities approximating the saturate hydrocarbons, for instance, carbon tetrachloride, will function equally as well as the desorbing agent although they are generally more expensive. Other organic solvents having absorbabilities similar to olefinic or aromatic hydrocarbons, such as trichloroethylene, 3-chloropentane, chloroform, chlorbenzene, methylene chloride, n-propylbromide, s-tetrachlorethane, brombenzene or the like may also be used but are not preferred.

The process of Fig. 3, which for illustration is described with reference to the separation of a charge composed of aromatic and saturate hydrocarbons, for example, a naphtha fraction boiling in the range of 300–400° F., is generally similar to the process described in connection with Fig. 1 but includes means for conducting the desorption step at relatively high temperature. As illustrated in Fig. 3, the process utilizes portions of the streams from the top of the adsorption and desorption zones, before distillation, as the respective transporting media. For purpose of description, the desorbing agent is considered to be pentane, although it is to be understood that other saturate hydrocarbons which are readily separable from the charge components by distillation would also be suitable as the desorbing agent.

Referring to Fig. 3, the charge is fed into adsorption zone 60 through line 61, a suspension of regenerated silica gel in the saturate material used as transporting medium is introduced into the upper part of the column through line 62, aromatic reflux is passed into the lower part of the column through line 63, and a portion of the aromatic stream from desorption zone 64 is introduced into the lowermost part of the column through line 65, all as described in connection with Fig. 1. The saturate product stream, which contains some pentane, is withdrawn from adsorption zone 60 through line 66 and that portion of it which is not utilized as transporting medium is sent through line 67 to a distillation zone (not shown) for recovery of the pentane. The remainder is forced by means of pump 81 through line 82, valve 83, and line 84 into the bottom of column 64 for use as transporting medium.

From the bottom of the adsorption zone a suspension of the silica gel, carrying adsorbed aromatics, is removed through line 68 and is pumped by means of pump 69 through line 70 to the upper part of desorption zone 64. A stream of pentane, which is heated in heater 71 sufficiently to maintain the desired high temperature in the desorption zone, is fed into the column through line 72. As a general rule, in separating aromatic from saturate hydrocarbons, it is preferred to heat the pentane to a temperature such that the average temperature in the desorption zone is at least 75° F. higher than the average temperature in the adsorption zone. The higher the temperature in the desorption operation the more effective is the desorption for a given proportion of desorbing agent used. Sufficient pressure should be maintained, of course, within the desorption zone to keep the desorbing agent and charge components in liquid phase. From the top of the desorption zone a stream of pentane and charge aromatics is withdrawn through line 73 and that portion of the stream which is not used as transporting medium is sent through line 74 to a distillation zone (not shown) for removal and recovery of the pentane. The remainder is pumped by means of pump 75 through lines 76 and 65 into the bottom of the adsorption zone as transporting medium. If desired, a cooler (not shown) may be included in line 76 for reducing the temperature of this material before it enters the adsorber column.

The treated adsorbent which settles to the bottom of desorption zone 64 should be cooled before being used for further treatment of the charge. This may be done in several ways. One way shown in Fig. 3 is to withdraw liquid from column 64 at a point below the level of introduction of pentane, pass it through a cooler and then introduce it back into the column. Thus, liquid may be withdrawn through inverted funnel 77, which permits separation of the liquid from the silica gel particles within the column, and passed through line 78 to cooler 79, thence being returned to the column through line 80. Another way comprises passing the portion of saturate product stream utilized as transporting medium through a cooler before introducing it into the bottom of column 64. Thus, the saturate material flowing through line 82 may be sent through valve 84, cooler 85 and valve 86, valve 83 being closed, before entering the desorption zone. Still another way of cooling the treated adsorbent is to provide a cooler (not shown) through which the suspension, which flows through line 87 and pump 88, may pass before being introduced into the upper part of adsorption zone 60. The latter procedure generally would not be preferred due to the presence of finely divided adsorbent in the cooler, which might result in erosion and lower heat transfer rates. Combinations of the above described methods of cooling may be employed, if desired, to accomplish the necessary heat removal before return of the silica gel to the adsorption zone. Cooling of the adsorbent may also be effected in other ways. For instance, the suspension of silica gel may be passed through line 62 into column 60 with or without previous cooling of the adsorbent and means may be provided for abstracting heat from the upper part of column 60 to reduce the temperature of the silica gel before it falls through the adsorption zone.

The above described process utilizing a relatively large temperature differential between the adsorption and desorption steps permits the desorption operation to be carried out efficiently with a desorbing agent of relatively low adsorbability compared to the aromatics, thus reducing the quantity of desorbing agent required. At the same time, it prevents a reduction in efficiency of the adsorption operation, which otherwise would result where a desorbing agent of relatively high adsorbability is carried into the adsorption zone by the adsorbent transporting stream.

While the process of the invention has been described with special reference to the separation of hydrocarbons, it will be understood that the principles of the process may be utilized in the separation of other liquid organic compounds having different adsorbabilities. Various modifications are permissible within the scope of the invention and will be apparent to those skilled in the art.

Having described my invention, what I claim and desire to protect by Letters Patent is:

1. Continuous process for separating a liquid charge mixture of organic compounds of different adsorbabilities by means of a selective adsorbent which comprises: feeding finely divided adsorbent, dispersed in a liquid as hereinafter specified, into a vertically elongated column adjacent the top, said column constituting a countercurrent adsorption zone; feeding into said column a liquid stream of the charge at an intermediate level and a liquid stream of hereinafter specified reflux at a lower level but above the bottom; maintaining an upward flow of liquid through the adsorption zone at such rate that the adsorbent particles fall countercurrent thereto in a substantially unobstructed downward path, thereby adsorbing and enriching the more adsorbable charge component; withdrawing from an upper part of the column a liquid stream rich in the less adsorbable charge component and containing desorbing agent hereinafter specified; continuously introducing below the level at which said reflux is introduced a liquid stream of transporting medium as hereinafter specified and passing the same downwardly in contact with the adsorbent particles, which carry the more adsorbable charge component as adsorbate, in amount to maintain the adsorbent in the form of a dispersion; passing said dispersion to a separate column constituting a countercurrent desorption zone and feeding it therein adjacent the top; introducing a liquid stream of desorbing agent into a lower part of the desorption column above the bottom and flowing a portion of it upwardly at such rate that the adsorbent particles fall countercurrent thereto in a substantially unobstructed downward path and the adsorbate is thereby desorbed, and a portion of it downwardly in amount to prevent upflow of liquid below the level at which desorbing agent is introduced, said desorbing agent being not substantially more strongly adsorbable than the more adsorbable charge component; withdrawing from an upper part of the desorption column a liquid stream comprising said adsorbate and desorbing agent; utilizing, as the said transporting medium, material comprising a portion of the adsorbate obtained from the desorption column; separating desorbing agent from at least a part of said liquid stream which is withdrawn from an upper part of the desorption column to obtain adsorbate and passing a portion of the latter to the adsorption column as said reflux; introducing a second liquid transporting medium, comprising a portion of the less adsorbable component product derived from the adsorption column, into the desorption column below the level at which desorbing agent is introduced and admixing the same with the mixture of adsorbent particles and downwardly flowing desorbing agent in amount to maintain the adsorbent in the form of a dispersion; and passing said dispersion to the upper part of the adsorption column for re-use of the adsorbent.

2. Process according to claim 1 wherein said liquid stream of transporting medium which is introduced into the adsorption column consists of a portion of the said liquid stream comprising adsorbate and desorbing agent which is withdrawn from an upper part of the desorption column.

3. Process according to claim 2 wherein said second liquid transporting medium which is introduced into the desorption column consists of a portion of the said liquid stream which is withdrawn from an upper part of the adsorption column.

4. Process according to claim 1 wherein said second liquid transporting medium which is introduced into the desorption column consists of a portion of the said liquid stream which is withdrawn from an upper part of the adsorption column.

5. Process according to claim 1 wherein the said liquid stream which is withdrawn from an upper part of the desorption column is subjected to distillation to separate desorbing agent therefrom and a portion of the resulting adsorbate product is utilized as said transporting medium which is introduced into the adsorption column.

6. Process according to claim 5 wherein the said liquid stream which is withdrawn from an upper part of the adsorption column is subjected to distillation to separate desorbing agent therefrom and a portion of the resulting product rich in the less adsorbable charge component is utilized as said second liquid transporting medium which is introduced into the desorption column.

7. Process according to claim 1 wherein the said liquid stream which is withdrawn from an upper part of the adsorption column is subjected to distillation to separate desorbing agent therefrom and a portion of the resulting product rich in the less adsorbable charge component is utilized as said second liquid transporting medium which is introduced into the desorption column.

8. Process according to claim 1 wherein the charge is a mixture of unsaturate and saturate hydrocarbons and the adsorbent is silica gel.

9. Process according to claim 8 wherein the desorbing agent is saturate hydrocarbon which boils outside of the boiling range of the charge.

10. Process according to claim 1 wherein the charge is a mixture of aromatic and saturate hydrocarbon and the adsorbent is silica gel.

11. Process according to claim 10 wherein the desorbing agent is saturate hydrocarbon which boils outside of the boiling range of the charge.

12. Process according to claim 11 wherein said liquid stream of desorbing agent is introduced into the desorption column at a temperature more than 75° F. higher than the temperature in the adsorption column and the adsorbent, after falling below the level at which desorbing agent is introduced to the desorption column, is cooled prior to re-use in the adsorption column, thereby maintaining the adsorption and desorption zones at relatively low and relatively high temperatures, respectively.

13. Process according to claim 1 wherein the charge is a mixture of olefinic and saturate hydrocarbons, the adsorbent is silica gel and the desorbing agent is saturate hydrocarbon which boils outside of the boiling range of the charge.

14. Continuous process for separating a liquid hydrocarbon charge of aromatic and saturate hydrocarbons by means of silica gel which comprises: feeding finely divided silica gel, dispersed in a liquid as hereinafter specified, into a vertically elongated column adjacent the top, said column constituting a countercurrent adsorption zone; feeding into said column a liquid stream of the charge at an intermediate level and a liquid stream of hereinafter specified reflux at a lower level but above the bottom; maintaining an upward flow of liquid through the adsorption zone at such rate that the silica gel falls countercurrent thereto in a substantially unobstructed downward path, thereby adsorbing and enriching the more adsorbable charge component; withdrawing from an upper part of the column a liquid stream rich in the saturate charge component and containing desorbing agent hereinafter specified; continuously introducing below the level at which said reflux is introduced a liquid stream of transporting medium as hereinafter specified and passing the same downwardly in contact with the silica gel, carrying the aromatic charge component as adsorbate, in amount to maintain the silica gel in the form of a dispersion; passing said dispersion to a separate column constituting a countercurrent desorption zone and feeding it therein adjacent the top; introducing liquid desorbing agent into a lower part of the desorption column above the bottom and flowing a portion of it upwardly at such rate that the silica gel falls countercurrent thereto in a substantially unobstructed downward path and the aromatic arsorbate is thereby desorbed, and a portion of it downwardly in amount to prevent upflow of liquid below the level at which desorbing agent is introduced, said desorbing agent being saturate hydrocarbon material which boils outside of the boiling range of the charge and being introduced to the desorption zone at a temperature more than 75° F. higher than the temperature in the adsorption zone; withdrawing from an upper part of the desorption column a liquid stream comprising said aromatic adsorbate and desorbing agent; utilizing, as the said transporting medium, a portion of the last mentioned liquid stream; separating desorbing agent from the remainder of said liquid stream to obtain aromatic adsorbate and passing a portion of the latter to the adsorption column as said reflux; introducing a second liquid transporting medium, consisting of a portion of the said liquid stream which is withdrawn from an upper part of the adsorption column, into the desorption column below the level at which desorbing agent is introduced and admixing the same with the mixture of silica gel and downwardly flowing desorbing agent in amount to maintain the adsorbent in the form of a dispersion; and passing said dispersion to the upper part of the adsorption column for re-use of the silica gel.

15. Process according to claim 14 wherein the silica gel, after falling below the level at which desorbing agent is introduced to the desorption column, is cooled prior to re-use in the adsorption column.

CARL E. OCKERT.

REFERENCES CITED

The following references are of record in the file of this patent:

UNITED STATES PATENTS

| Number | Name | Date |
| --- | --- | --- |
| 1,678,298 | Patrick | July 24, 1928 |
| 2,384,311 | Kearby | Sept. 4, 1945 |
| 2,395,491 | Mavity | Feb. 26, 1946 |
| 2,420,761 | Thomas | May 20, 1947 |
| 2,448,489 | Hirschler | Aug. 31, 1948 |
| 2,470,339 | Claussen | May 17, 1949 |